(12) United States Patent
Wu et al.

(10) Patent No.: US 11,408,219 B2
(45) Date of Patent: Aug. 9, 2022

(54) HATCH DOOR DETECTION METHOD AND SYSTEM, MOBILE PLATFORM, AND PLANT PROTECTION VEHICLE

(71) Applicant: SZ DJI TECHNOLOGY CO., LTD., Shenzhen (CN)

(72) Inventors: Xumin Wu, Shenzhen (CN); Zhuang Feng, Shenzhen (CN); Zijing Chang, Shenzhen (CN); Xidi Huang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/893,118

(22) Filed: Jun. 4, 2020

(65) Prior Publication Data

US 2020/0300017 A1    Sep. 24, 2020

Related U.S. Application Data

(63) Continuation of application No. PCT/CN2017/116913, filed on Dec. 18, 2017.

(51) Int. Cl.
*E05F 15/00* (2015.01)
*E05F 15/40* (2015.01)
*E05F 15/614* (2015.01)

(52) U.S. Cl.
CPC ............ *E05F 15/40* (2015.01); *E05F 15/614* (2015.01)

(58) Field of Classification Search
CPC ....... E05F 15/603; E05F 15/40; E05F 15/614; E05Y 2900/60; E05Y 2400/32; G01M 13/00; A01M 9/0053

USPC .............................................. 49/31
See application file for complete search history.

(56) References Cited

U.S. PATENT DOCUMENTS

| 3,505,513 A | 4/1970 | Fowler et al. |
| 10,538,149 B1* | 1/2020 | DiCarlo ................... B60J 5/047 |
| 2004/0124801 A1* | 7/2004 | Jurado ............... G05B 13/0265 318/476 |
| 2009/0173006 A1* | 7/2009 | Jitsuishi .................. E05F 15/40 49/31 |

(Continued)

FOREIGN PATENT DOCUMENTS

| CN | 1707376 A | 12/2005 |
| CN | 101596851 A | 12/2009 |

(Continued)

OTHER PUBLICATIONS

The World Intellectual Property Organization (WIPO) International Search Report for PCT/CN2017/116913 dated Sep. 7, 2018 5 pages.

(Continued)

*Primary Examiner* — Chi Q Nguyen
(74) *Attorney, Agent, or Firm* — Anova Law Group, PLLC

(57) ABSTRACT

A door detection method includes controlling a door of a spreading apparatus to move toward to a preset position, obtaining first status information of an associated component of the door when the door stops moving, and determining whether the door has moved to the preset position according to the first status information and second status information. The second status information is status information of the associated component when the door is located at the preset position.

20 Claims, 9 Drawing Sheets

(56) References Cited

U.S. PATENT DOCUMENTS

| | | | | |
|---|---|---|---|---|
| 2014/0000166 | A1* | 1/2014 | Groewe | E05F 15/611 49/31 |
| 2016/0053524 | A1* | 2/2016 | Serban | E05F 15/43 701/49 |
| 2017/0247926 | A1* | 8/2017 | Elie | E05F 15/73 |
| 2018/0266159 | A1* | 9/2018 | Bito | E05F 15/40 |
| 2018/0321758 | A1* | 11/2018 | Serban | G06F 3/0325 |
| 2018/0363353 | A1* | 12/2018 | Ghannam | E05B 81/76 |
| 2018/0363357 | A1* | 12/2018 | Polewarczyk | E05F 15/73 |
| 2018/0371822 | A1* | 12/2018 | Rrumbullaku | E05F 15/75 |
| 2019/0048646 | A1* | 2/2019 | Tachibana | E05F 15/77 |
| 2019/0128040 | A1* | 5/2019 | Mitchell | E05F 15/40 |

FOREIGN PATENT DOCUMENTS

| | | |
|---|---|---|
| CN | 101716567 A | 6/2010 |
| CN | 201795810 U | 4/2011 |
| CN | 201951214 U | 8/2011 |
| CN | 202692974 U | 1/2013 |
| CN | 203321177 U | 12/2013 |
| CN | 103967373 A | 8/2014 |
| CN | 204331334 U | 5/2015 |
| CN | 204750563 U | 11/2015 |
| CN | 105387796 A | 3/2016 |
| CN | 105511258 A | 4/2016 |
| CN | 105711495 A | 6/2016 |
| CN | 205381404 U | 7/2016 |
| CN | 105991120 A | 10/2016 |
| CN | 106023227 A | 10/2016 |
| CN | 106347210 A | 1/2017 |
| CN | 106404011 A | 2/2017 |
| CN | 205981707 U | 2/2017 |
| CN | 106873631 A | 6/2017 |
| CN | 206362563 U | 7/2017 |
| JP | S492533 B1 | 1/1974 |
| JP | 2003339297 A | 12/2003 |
| JP | 2013000071 A | 1/2013 |
| JP | 2016096774 A | 5/2016 |
| KR | 20140042250 A | 4/2014 |

OTHER PUBLICATIONS

Beom W. Gu, et al., Robotic Suction Nozzle Design Optimization for Severe Accident Portable Air-Cleaning System, Progress in Nuclear Energy, 2016, pp. 7-25.

Zhi-Qiang Zhao, et al., Reliability Analysis and Test of Rudder Deployment Mechanism, Failure Analysis and Prevention, Jun. 2017, vol. 12, No. 3.

* cited by examiner

HATCH DOOR DETECTION METHOD AND SYSTEM, MOBILE PLATFORM, AND PLANT PROTECTION VEHICLE

CROSS-REFERENCE TO RELATED APPLICATION

This application is a continuation of International Application No. PCT/CN2017/116913, filed Dec. 18, 2017, the entire content of which is incorporated herein by reference.

TECHNICAL FIELD

The present disclosure relates to agricultural operation field, and more particularly, to a door detection method and system, a mobile platform, and a plant protection machine.

BACKGROUND

In existing technologies, a spreading apparatus is provided at a mobile platform such as a plant protection machine or an unmanned ground vehicle during agricultural operations. The spreading apparatus is configured to spread particle chemicals, so as to realize the advantages of uniform particle distribution, and the spread being unaffected by the weather.

In practical applications, the control system of the mobile platform adopts an open-loop control for the door of the spreading apparatus, and due to a low accuracy of a mechanical mechanism or a low accuracy of a manufacturing process of an assembly, the door may not be able to move to a preset position, that is, the accuracy of the door opening or closing is not high, which can easily cause damage to the door, and reduces the life of the spreading apparatus and is not conductive to a precise control of the spreading operation.

SUMMARY

In accordance with the disclosure, there is provided a door detection method including controlling a door of a spreading apparatus to move toward to a preset position, obtaining first status information of an associated component of the door when the door stops moving, and determining whether the door has moved to the preset position according to the first status information and second status information. The second status information is status information of the associated component when the door is located at the preset position.

Also in accordance with the disclosure, there is provided a door detection system including a door, an associated component of the door, and one or more processors operating individually or in cooperation and configured to control the door to move toward to a preset position, obtain first status information of the associated component when the door stops moving, and determine whether the door has moved to the preset position according to the first status information and second status information. The second status information is status information of the associated component when the door is located at the preset position.

Also in accordance with the disclosure, there is provided a plant protection machine including a body, an arm extending from the body, a power assembly provided at the arm, a spreading apparatus provided at the body including a door and an associated component of the door, and one or more processors operating individually or in cooperation and configured to control the door to move toward to a preset position, obtain first status information of an associated component of the door when the door stops moving, and determine whether the door has moved to the preset position according to the first status information and second status information. The second status information is status information of the associated component when the door is located at the preset position.

DETAILED DESCRIPTION OF THE EMBODIMENTS

In order to more clearly explain the embodiments of the present disclosure, technical solutions of the present disclosure will be described in detail with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Figure 1A:
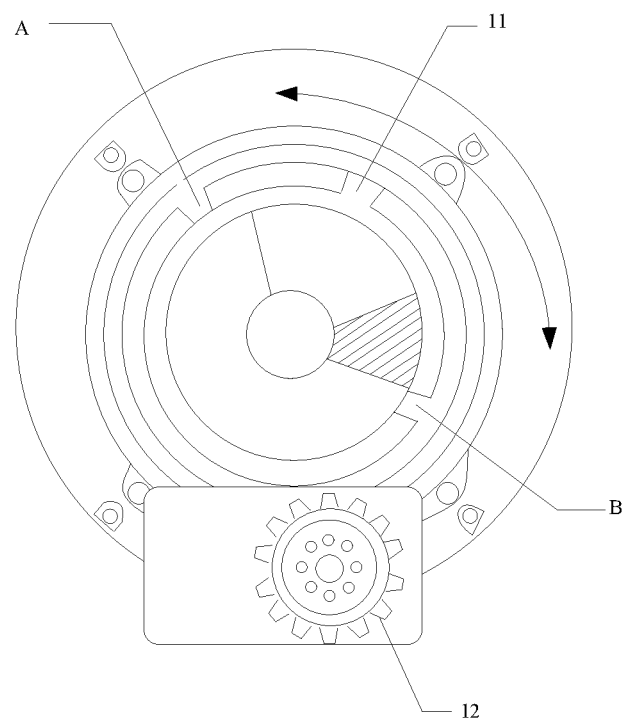
FIG. 1A and FIG. 1B are schematic diagrams showing movement status of a door according to one embodiment of the present disclosure.
Figure 1B:
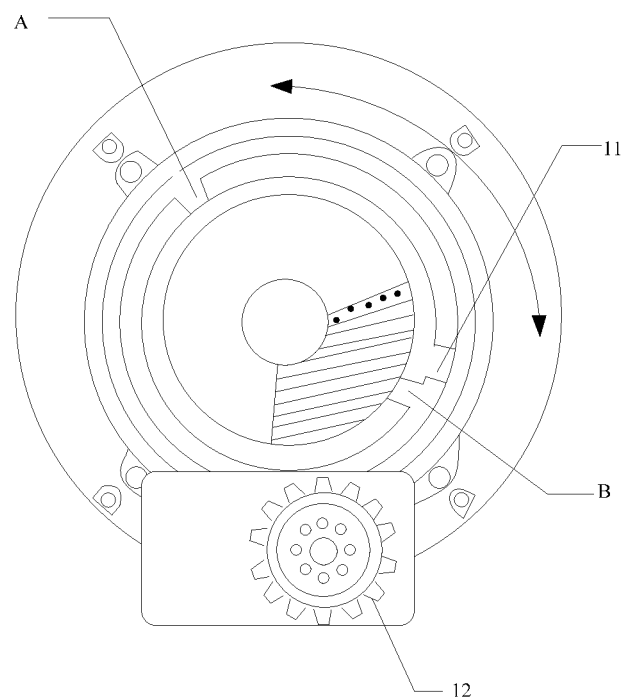

A spreading apparatus is provided at a mobile platform, e.g., a plant protection machine (such as a plant protection vehicle) or an unmanned ground vehicle during agricultural operations. The spreading apparatus is configured to spread particle chemicals, so as to realize the advantages of uniform particle distribution, and the spread being unaffected by the weather. FIG. 1A and FIG. 1B are schematic diagrams showing movement statuses of a door consistent with embodiments of the present disclosure. The door (a hatch door) has a double-layer structure with a fan-shaped through hole on each layer. In normal circumstances, when the two fan-shaped through holes do not overlap, the door is closed. When the two fan-shaped through holes have an overlapping area, the door is open. When the two fan-shaped through holes completely overlap, the door is fully open. As shown in FIG. 1A, a driving motor 12 drives the door to rotate. A black line from a fully closed position A to a fully open position B of the door indicates a movement range of the door, in which a limit block 11 can slide. The door is driven by the driving motor 12 to become larger or smaller, thereby controlling the discharge rate. The shaded fan-shaped area indicates the opening of the door. As shown in FIG. 1B, due to an assembly accuracy of the spreading apparatus or a gear meshing, the limit block 11 may not be able to contact the fully open position B (the shaded fan-shaped area indicates the opening of the door, and the fan-shaped area with black dots indicates an area of unopened door). As a result, the door may not be able to be fully opened, affecting the maximum discharge rate. When the door cannot reach the preset position, discharge concentration of the spreading apparatus is affected. In some embodiments, if the discharge concentration is low, an operation requirement may not be met; if the discharge concentration is high, a serious chemical damage to crops may be caused. On the other hand, a mismatch between the stroke that controls the opening of the door and the mechanical limit may cause the opening of the door to be too small or too large, resulting in a damage or deformation of the door, and hence shortens the life of the spreading apparatus.

According to the embodiments of the present disclosure, there is provided a door detection method and system, a mobile platform, and a plant protection machine.

Figure 2:
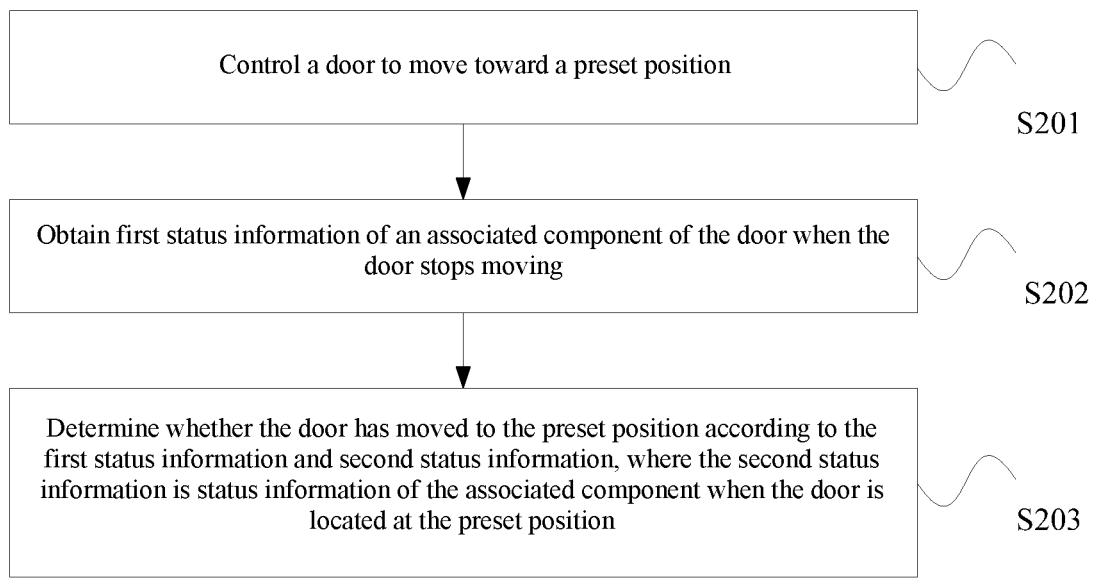
FIG. 2 is a schematic flowchart of a door detection method according to one embodiment of the present disclosure.

FIG. 2 is a schematic flowchart of a door detection method according to one embodiment of the present disclosure. The method shown in FIG. 2 can be applied to, e.g., a spreading apparatus of a mobile platform, and can be implemented by, e.g., the spreading apparatus, one or more processors of the spreading apparatus, the mobile platform, or one or more processors the mobile platform, the one or more processors of the spreading apparatus and the one or more processors of the mobile platform, or a control system, e.g., a remote controller of the mobile platform.

As shown in FIG. 2, at S201, a door is controlled to move toward a preset position.

In some embodiments, the preset position may be a fully open position or a fully closed position of the door, or a half position of the movement range of the door, and is not limited here.

In some embodiments, a control system controls the door to move toward a preset position through a control signal, e.g., the control system transmits a control signal to a driving motor to cause the driving motor to drive the door to rotate and move toward the preset position. In some embodiments, the control signal may be a Pulse Width Modulation (PWM) signal.

At S202, first status information of an associated component of the door is obtained when the door stops moving. The first status information is also referred to as a "detected status information."

At S203, whether the door has moved to the preset position, i.e., whether the door has arrived at the preset position, is determined according to the first status information and second status information, where the second status information is status information of the associated component when the door is located at the preset position, and is also referred to as a "reference status information."

The door stopping moving includes the door having moved to the preset position, or the door stopping moving due to a low accuracy of a mechanical mechanism, a low accuracy of a manufacturing process of an assembly, or presence of an obstacle.

The associated component may be a driving motor for driving the door to rotate, a sensor at the preset position, or a limit switch at the preset position, etc.

When the associated component is a driving motor connected to the door, correspondingly, the first status information is electric current information of the driving motor when the door stops moving, and the second status information is electric current information of the driving motor when the door is located at the preset position. In some embodiments, the preset position is the fully open position of the door, and when the limit block contacts the fully open position of the door, the driving motor is blocked and the driving current (driving electric current) is bound to increase. That is, at this position, the driving motor has corresponding electric current information that is the second status information. As described above, the door stopping moving includes the door having moved to the preset position, or the door stopping moving due to a low accuracy of a mechanical mechanism, a low accuracy of a manufacturing process of an assembly, or presence of an obstacle. No matter which of these causes the door to stop moving, the first status information is the electric current information of the driving motor when the door stops.

When the associated component is a sensor at the preset position, correspondingly, the first status information is position information of the door obtained by the sensor when the door stops moving, and the second status information is position information of the door obtained by the sensor when the door is located at the preset position. In some embodiments, the preset position is the fully open position of the door, and a sensor is provided at the position to obtain the position information of the door, e.g., coordinate information of the door. When the door reaches the fully open position, the sensor can obtain the position information of the door. As described above, the door stopping moving includes the door having moved to the preset position, or the door stopping moving due to a low accuracy of a mechanical mechanism, a low accuracy of a manufacturing process of an assembly, or presence of an obstacle. No matter which of these causes the door to stop moving, the first status information is the position information of the door obtained by the sensor. In some embodiments, the sensor is a position sensor or a rotation angle sensor, and is not limited here.

When the associated component is a limit switch, correspondingly, the first status information is status information of the limit switch when the door stops moving, and the second status information is status information of the limit switch when the door is located at the preset position. The status information of the limit switch includes two status: on and off. In some embodiments, the preset position is the fully open position of the door, and a limit switch is provided at the position. When the door has not moved to this position, the limit switch is off (represented by "0"); and when the door reaches this position, the limit switch is on (represented by "1"). In this case, the second status information is 1. The first status information is the status information of the limit switch when the door stops moving, which may be 0 or 1. In some embodiments, if the reason why the door stops moving is that the door has moved to the preset position, the first status information is 1; if the reason why the door stops moving is due to a low accuracy of a mechanical mechanism, a low accuracy of a manufacturing process of an assembly, or presence of an obstacle, the first status information is 0.

In some embodiments, the control system may obtain the second status information from other device, and the other device may collect the second status information of other spreading apparatuses that are the same as the spreading apparatus and average the second status information to obtain the second status information of the spreading apparatus. In some embodiments, the second status information has been prestored in a memory of the mobile platform or a memory of the spreading apparatus, and the control system does not need to obtain the second status information from other device.

Further, after obtaining the first status information of the associated component of the door, the control system may determine whether the door has moved to the preset position according to the first status information and the second status information. In some embodiments, the control system determines whether the door has moved to the preset position only according to the first status information and the second status information. In some other embodiments, the control system determines whether the door has moved to the preset position according to the first status information, the second status information, and other information.

In some embodiments, if it is determined that the door has not moved to the preset position, S201 to S203 are continuously executed. Or, if it is determined that the door has not moved to the preset position, the door can be calibrated by a staff, and the control system continues to execute S201 to S203 after the calibration.

According to the embodiments of the present disclosure, there is provided a door detection method including controlling a door to move toward a preset position, obtaining, when the door stops moving, first status information of an associated component of the door, and determining, according to the first status information and second status information, whether the door has moved to the preset position. The method can effectively detect whether the door has moved to the preset position. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

S203 is described in detail with reference to the following embodiments.

Figure 3:
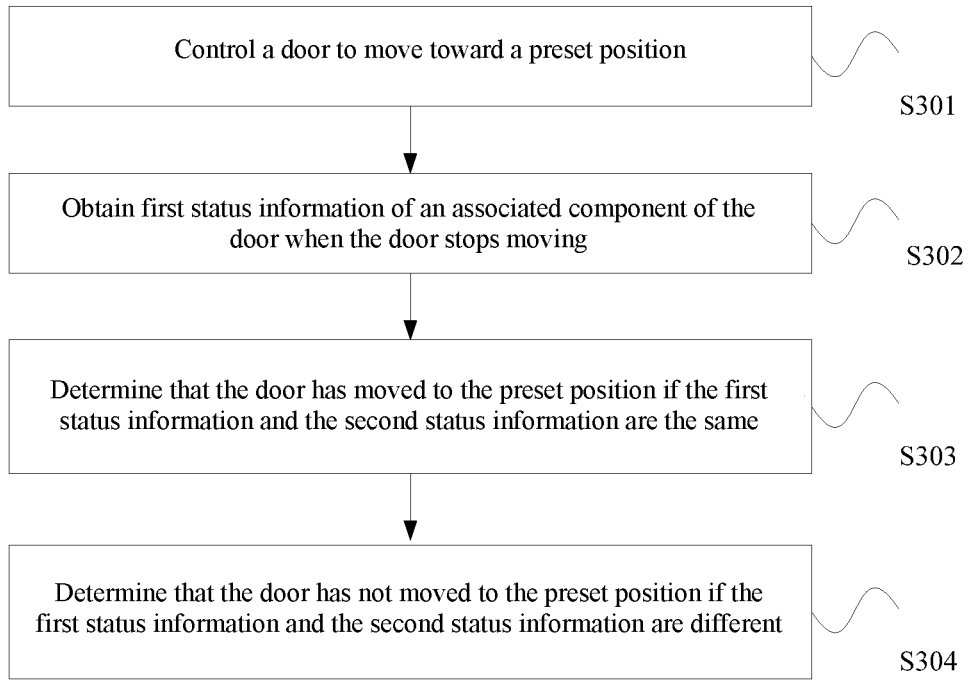
FIG. 3 is a schematic flowchart of a door detection method according to another embodiment of the present disclosure.

FIG. 3 is a schematic flowchart of a door detection method according to another embodiment of the present disclosure.

As shown in FIG. 3, at S301, a door is controlled to move toward a preset position.

At S302, first status information of an associated component of the door is obtained when the door stops moving.

S301 and S302 are similar to S201 and S202, respectively. For details of S301 and S302, reference can be made to the description above of S201 and S202, which will not be repeated here.

At S303, it is determined that the door has moved to the preset position if the first status information and the second status information are the same.

At S304, it is determined that the door has not moved to the preset position if the first status information and the second status information are different.

When the associated component is a driving motor connected to the door, correspondingly, the first status information is electric current information of the driving motor when the door stops moving (referred to as the first electric current information), and the second status information is electric current information of the driving motor when the door is located at the preset position (referred to as the second electric current information). In some embodiments, the first electric current information and the second electric current information are both current values (electric current values). In some embodiments, it is determined that the door has moved to the preset position if the first electric current information and the second electric current information are the same. In some embodiments, it is determined that the door has not moved to the preset position if the first electric current information and the second electric current information are different.

When the associated component is a sensor at the preset position, correspondingly, the first status information is position information of the door obtained by the sensor when the door stops moving (referred to as the first position information), and the second status information is position information of the door obtained by the sensor when the door is located at the preset position (referred to as the second position information). In some embodiments, the first position information and the second position information are both coordinate information where the coordinate may be a plane coordinate, a spatial coordinate, or an angular coordinate, etc. In some embodiments, it is determined that the door has moved to the preset position if the first position information and the second position information are the same. In some embodiments, it is determined that the door has not moved to the preset position if the first position information and the second position information are different.

When the associated component is a limit switch, correspondingly, the first status information is status information of the limit switch when the door stops moving, and the second status information is status information of the limit switch when the door is located at the preset position. The status information of the limit switch includes two status: on and off. In some embodiments, it is determined that the door has moved to the preset position if the first status information and the second status information are the same, e.g., both on or off. In some embodiments, it is determined that the door has not moved to the preset position if the first status information and the second status information are different, e.g., the first status information is on while the second status information is off, or, the first status information is off while the second status information is on.

According to the embodiments of the present disclosure, there is provided a door detection method, where it is determined that the door has moved to the preset position if the first status information and the second status information are the same. In some embodiments, it is determined that the door has not moved to the preset position if the first status information and the second status information are different. The method can effectively detect whether the door has moved to the preset position. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

Figure 4:
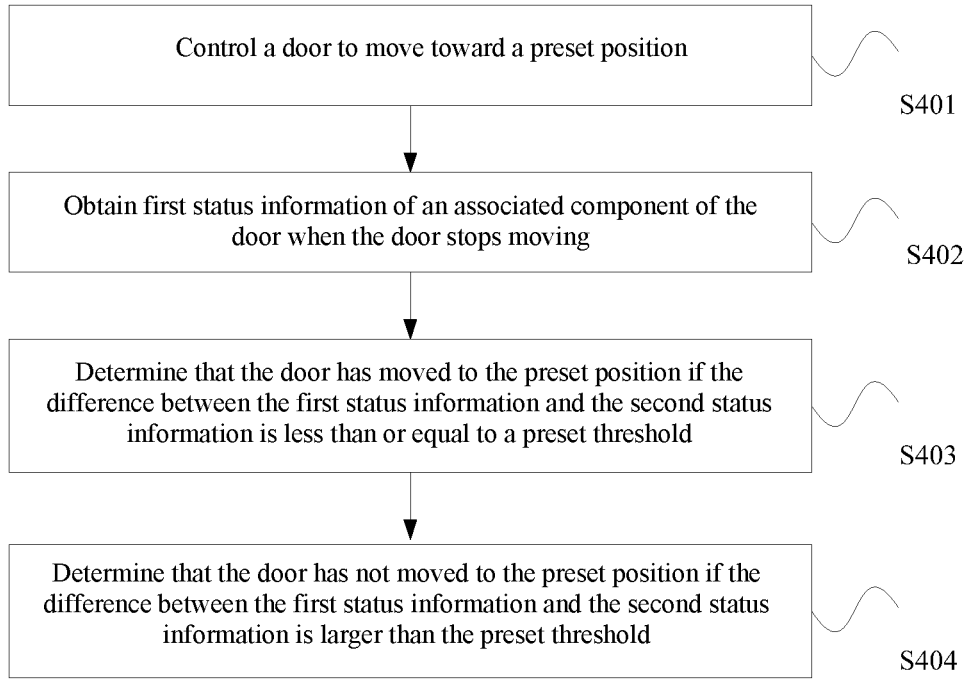
FIG. 4 is a schematic flowchart of a door detection method according to another embodiment of the present disclosure.

FIG. 4 is a schematic flowchart of a door detection method according to another embodiment of the present disclosure.

As shown in FIG. 4, at S401, a door is controlled to move toward a preset position.

At S402, first status information of an associated component of the door is obtained when the door stops moving.

S401 and S402 are similar to S201 and S202, respectively. For details of S401 and S402, reference can be made to the descriptions above of S201 and S202, which will not be repeated here.

At S403, it is determined that the door has moved to the preset position if the difference between the first status information and the second status information is less than or equal to a preset threshold.

At S404, it is determined that the door has not moved to the preset position if the difference between the first status information and the second status information is larger than the preset threshold.

When the associated component is a driving motor connected to the door, correspondingly, the first status information is electric current information of the driving motor when the door stops moving (referred to as the first electric current information), and the second status information is electric current information of the driving motor when the door is located at the preset position (referred to as the second electric current information). In some embodiments, the first electric current information and the second electric current information are both current values. In some embodiments, it is determined that the door has moved to the preset position if the difference between the first electric current information and the second electric current information is less than or equal to a preset threshold. In some embodiments, it is determined that the door has not moved to the preset position if the difference between the first electric current information and the second electric current information is larger than the preset threshold. The preset threshold is a preset threshold for current, which can be understood as an electric current error since a certain error exists when the electric current is measured by an ampere meter. The preset threshold can be determined according to the error of the ampere meter.

When the associated component is a sensor at the preset position, correspondingly, the first status information is position information of the door obtained by the sensor when the door stops moving (referred to as the first position information), and the second status information is position information of the door obtained by the sensor when the door is located at the preset position (referred to as the second position information). In some embodiments, the first position information and the second position information are both coordinate information where the coordinate may be a plane coordinate, a spatial coordinate, or an angular coordinate, etc. In some embodiments, it is determined that the door has moved to the preset position if the difference between the first position information and the second position information is less than or equal to a preset threshold. In some embodiments, it is determined that the door has not moved to the preset position if the difference between the first position information and the second position information is larger than the preset threshold. The preset threshold is a preset threshold for a coordinate, which can be understood as a coordinate error.

When the associated component is a limit switch, correspondingly, the first status information is status information of the limit switch when the door stops moving, and the second status information is status information of the limit switch when the door is located at the preset position. The status information of the limit switch includes two status: on and off. In some embodiments, a preset threshold is larger than 0 and smaller than 1. It is determined that the door has moved to the preset position if the difference between the first status information and the second status information is less than or equal to a preset threshold, e.g., both status information are on (represented by "1") or off (represented by "0") and the difference is 0 that is smaller or equal to the threshold. It is determined that the door has not moved to the preset position if the difference between the first status information and the second status information is larger than the preset threshold, e.g., the first status information is on (represented by "1") and the second status information is off (represented by "0"), or, the first status information is off (represented by "0") and the second status information is on (represented by "1"), and the difference is 1 that is larger than the threshold.

According to the embodiments of the present disclosure, there is provided a door detection method, where it is determined that the door has moved to the preset position if the difference between the first status information and the second status information is less than or equal to a preset threshold. In some embodiments, it is determined that the door has not moved to the preset position if the difference between the first status information and the second status information is larger than the preset threshold. The method can effectively detect whether the door has moved to the preset position. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

Figure 5:
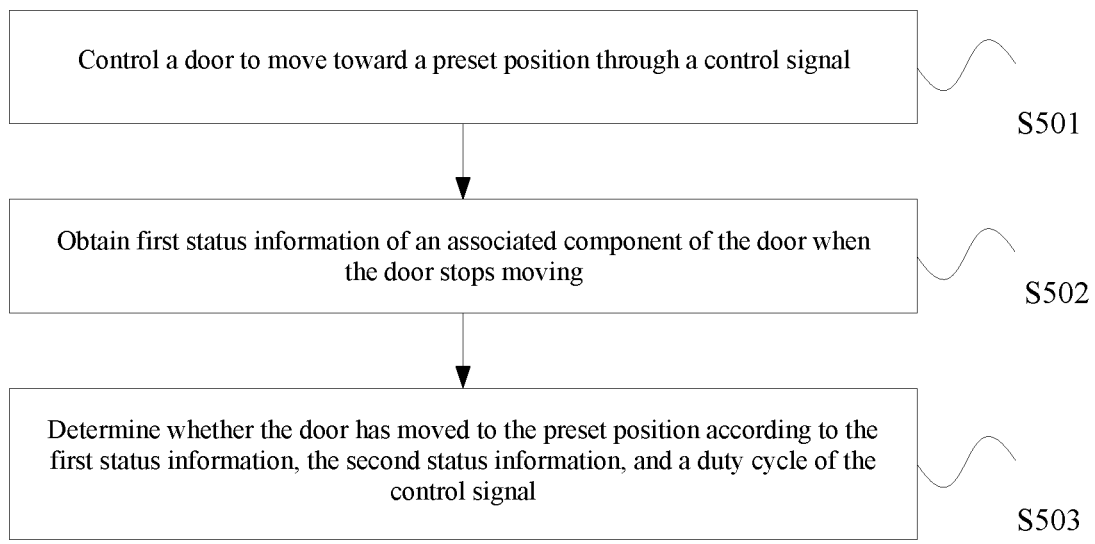
FIG. 5 is a schematic flowchart of a door detection method according to another embodiment of the present disclosure.

FIG. 5 is a schematic flowchart of a door detection method according to another embodiment of the present disclosure.

As shown in FIG. 5, at S501, a door is controlled to move toward a preset position through a control signal.

At S502, first status information of an associated component of the door is obtained when the door stops moving.

In some embodiments, a control system controls the door to move toward a preset position through the control signal, e.g., the control system transmits a control signal to a driving motor to make the driving motor drive the door to rotate and move toward the preset position. In some embodiments, the control signal may be a Pulse Width Modulation (PWM) signal.

S502 is similar to S202. For details of S502, reference can be made to the description of S202, which will not be repeated here.

S503, whether the door has moved to the preset position is determined according to the first status information, the second status information, and the duty cycle of the control signal.

In this embodiment, when the door moves toward the preset position, an obstacle may exist to cause the door to stop moving, and the first status information and the second status information may also be the same. The embodiment of the present disclosure combines the duty cycle of the control signal to determine whether the door has moved to the preset position to improve the accuracy of the door detection.

According to the embodiments of the present disclosure, there is provided a door detection method, where a control system can determine whether the door has moved to the preset position according to the first status information, the second status information, and the duty cycle of the control signal. The method can improve the accuracy of the door detection. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

Figure 6:
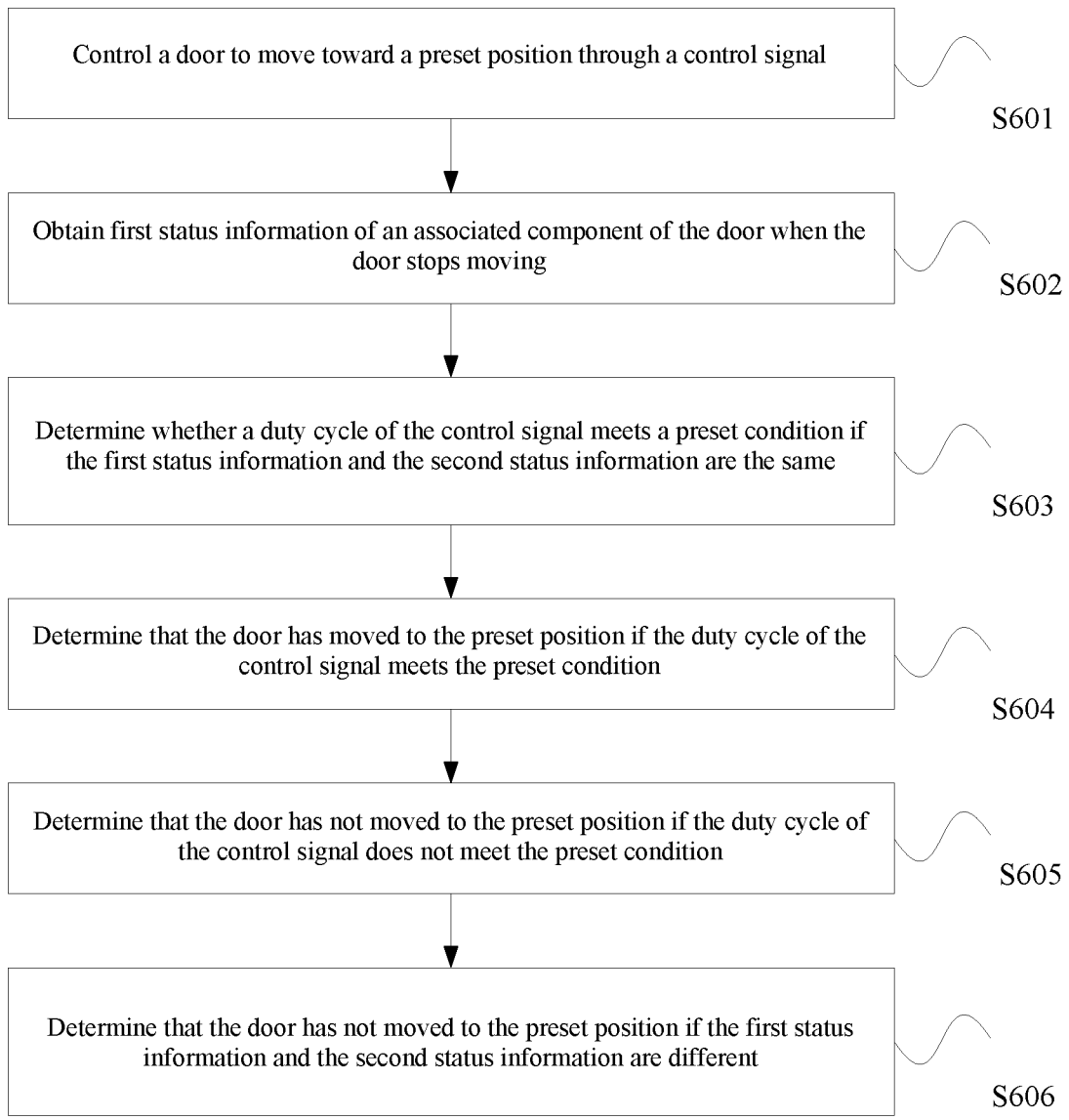
FIG. 6 is a schematic flowchart of a door detection method according to another embodiment of the present disclosure.

FIG. 6 is a schematic flowchart of a door detection method according to another embodiment of the present disclosure.

As shown in FIG. 6, at S601, a door is controlled to move toward a preset position.

At S602, first status information of an associated component of the door is obtained when the door stops moving.

S601 and S602 are similar to S501 and S202, respectively. For details of S601 and S602, reference can be made to the descriptions of S501 and S202, which will not be repeated here.

At S603, whether the duty cycle of the control signal meets a preset condition is determined if the first status information and the second status information are the same.

At S604, it is determined that the door has moved to the preset position if the duty cycle of the control signal meets the preset condition.

At S605, it is determined that the door has not moved to the preset position if the duty cycle of the control signal does not meet the preset condition.

At S606, it is determined that the door has not moved to the preset position if the first status information and the second status information are different.

Details of the first status information and the second status information, and the method for determining whether the first status information and the second status information are the same are described above, and will not be repeated here.

The preset condition is described as following. In some embodiments, when the door reaches the fully open position, the duty cycle of the control signal is usually 5% or 10%, and the preset condition is that the duty cycle of the control signal is 5% or 10%. When the door reaches the fully closed position, the duty cycle of the control signal is usually 95% or 90%, and the preset condition is that the duty cycle of the control signal is 95% or 90%.

It is noted that different preset positions may have different preset conditions, and although the preset condition in the above example is a specific value, e.g., 5%, 95%, etc., considering that an error may exist in determining the duty cycle of the control signal, the preset condition may also be a numerical range. For example, when the door reaches the fully open position, the preset condition is that the duty cycle of the control signal is 5% to 10%, or smaller than 10%, etc. When the door reaches the fully closed position, the preset condition is that the duty cycle of the control signal is 90% to 95%, or greater than 90%.

According to the embodiments of the present disclosure, there is provided a door detection method, where whether the duty cycle of the control signal meets a preset condition is determined if the first status information and the second status information are the same. It is determined that the door has moved to the preset position if the duty cycle of the control signal meets the preset condition. It is determined that the door has not moved to the preset position if the duty cycle of the control signal does not meet the preset condition. It is determined that the door has not moved to the preset position if the first status information and the second status information are different. The method can improve the accuracy of the door detection. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

Figure 7:
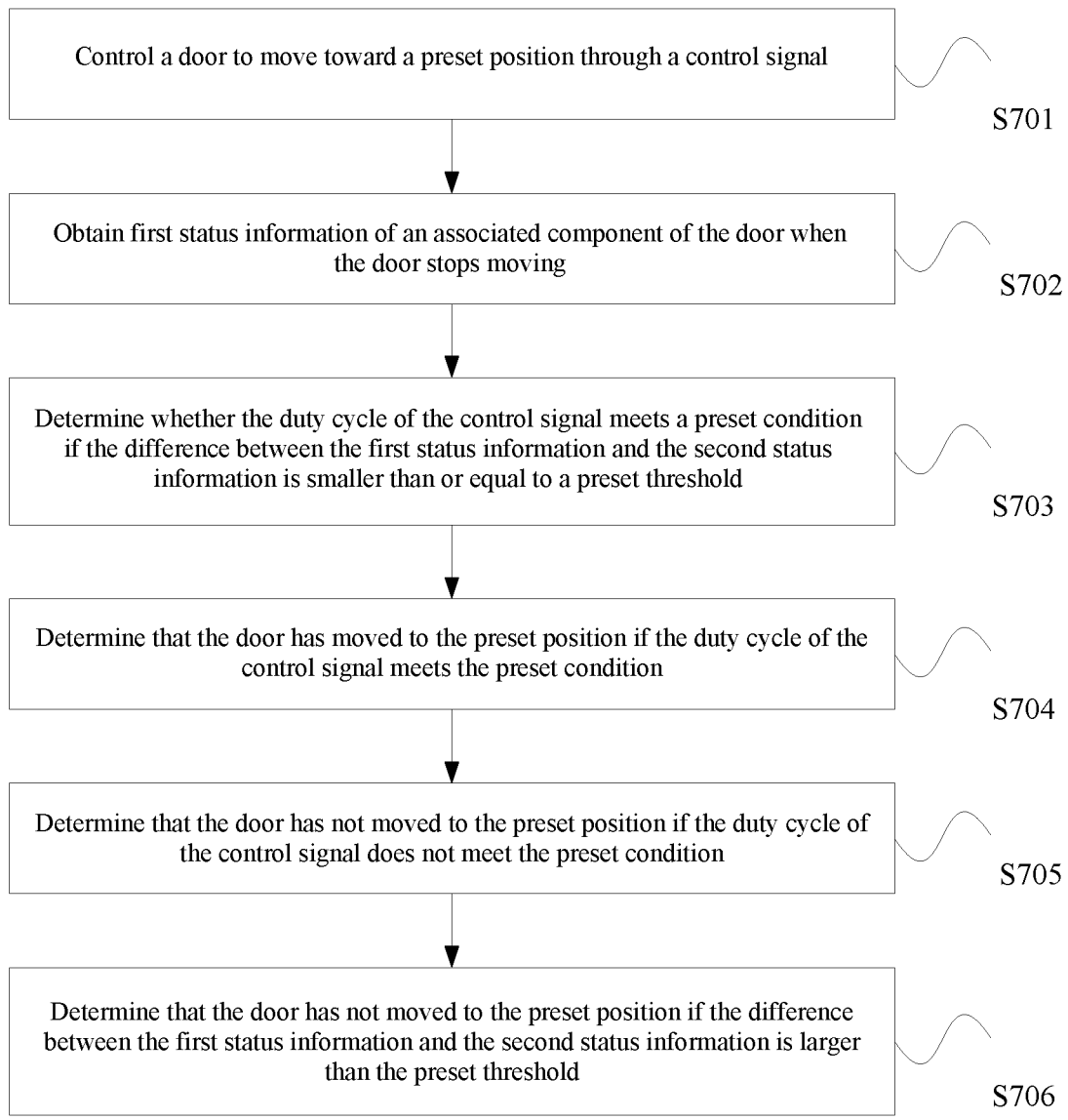
FIG. 7 is a schematic flowchart of a door detection method according to another embodiment of the present disclosure.

FIG. 7 is a schematic flowchart of a door detection method according to another embodiment of the present disclosure.

As shown in FIG. 7, at S701, a door is controlled to move toward a preset position.

At S702, first status information of an associated component of the door is obtained when the door stops moving.

S701 and S702 are similar to S501 and S202, respectively. For details of S701 and S702, reference can be made to the descriptions of S501 and S202, which will not be repeated here.

At S703, whether the duty cycle of the control signal meets a preset condition is determined if the difference between the first status information and the second status information is smaller than or equal to a preset threshold.

At S704, it is determined that the door has moved to the preset position if the duty cycle of the control signal meets the preset condition.

At S705, it is determined that the door has not moved to the preset position if the duty cycle of the control signal does not meet the preset condition.

At S706, it is determined that the door has not moved to the preset position if the difference between the first status information and the second status information is larger than the preset threshold.

Details of the first status information and the second status information, and the method for determining the relationship between the first status information and the second status information and a preset threshold are described above, and will not be repeated here.

The preset condition is described in the embodiments above and will not be repeated here.

According to the embodiments of the present disclosure, there is provided a door detection method, where whether the duty cycle of the control signal meets a preset condition is determined if the difference between the first status information and the second status information is smaller than or equal to a preset threshold. It is determined that the door has moved to the preset position if the duty cycle of the control signal meets the preset condition. It is determined that the door has not moved to the preset position if the duty cycle of the control signal does not meet the preset condition. It is determined that the door has not moved to the preset position if the difference between the first status information and the second status information is larger than the preset threshold. The method can improve the accuracy of the door detection. If it is detected that the door has not moved to the preset position, a staff can calibrate the door or control the system to execute the door detection method again. The method embodiment can accurately control the discharge concentration of the spreading apparatus, and reduce the probability of damage and deformation of the door, and hence extend the life of the spreading apparatus.

It should be noted that in any of the above embodiments, if the control system determines that the door has moved to the preset position, the door detection process can be stopped for the case of only one preset position. When more than one preset position exists, the embodiments of the present disclosure also provide a corresponding door detection method.

Figure 8:
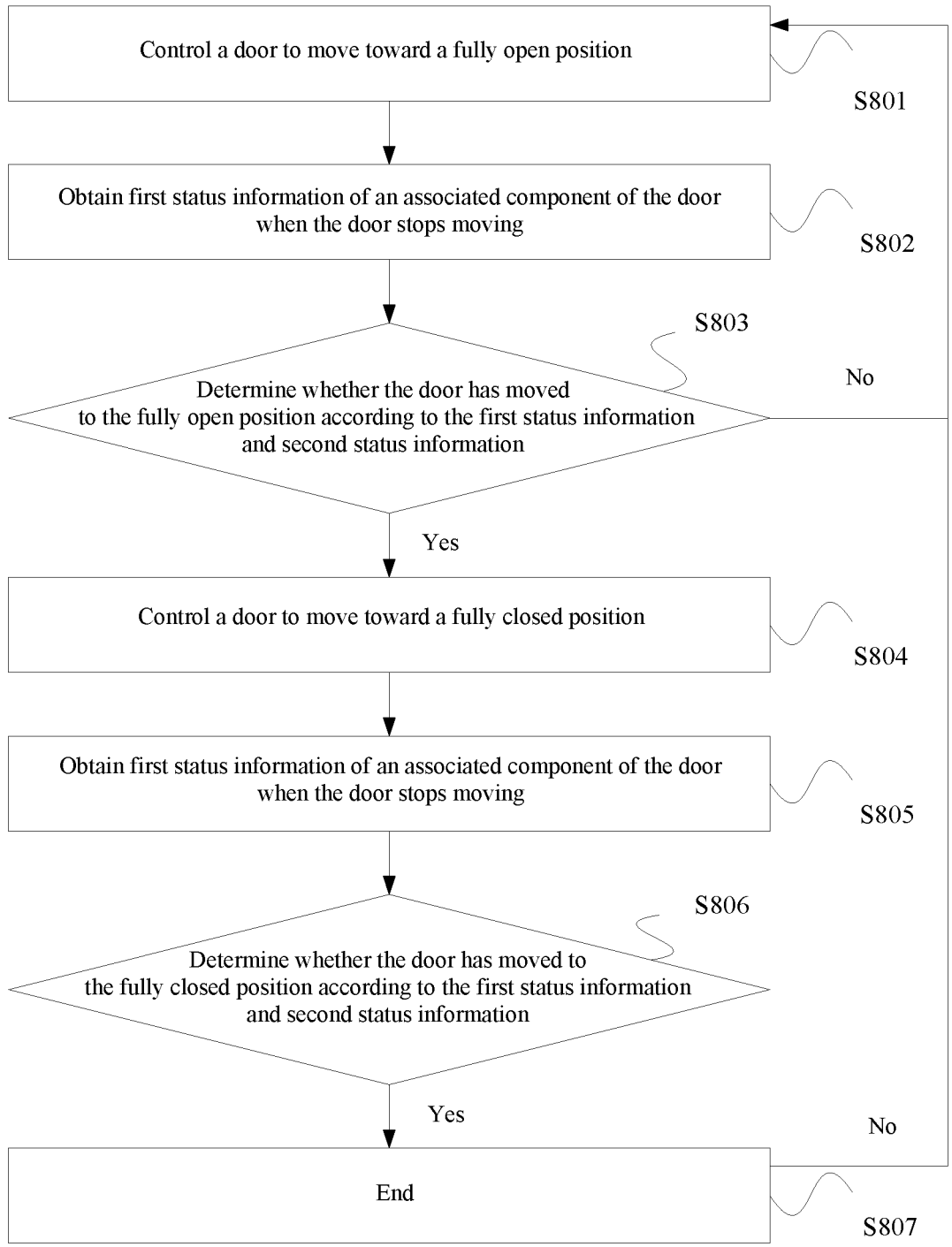
FIG. 8 is a schematic flowchart of a door detection method according to another embodiment of the present disclosure.

FIG. 8 is a schematic flowchart of a door detection method according to another embodiment of the present disclosure. As shown in FIG. 8, at S801, a door is controlled to move toward a fully open position.

At S802, first status information of an associated component of the door is obtained when the door stops moving.

At S803, whether the door has moved to the fully open position is determined according to the first status information and second status information. If yes, S804 is executed, otherwise, S801 is executed. The second status information is the status information of the associated component when the door is located at the fully open position.

At S804, the door is controlled to move toward a fully closed position.

At S805, first status information of the associated component of the door is obtained when the door stops moving.

At S806, whether the door has moved to the fully closed position is determined according to the first status information and second status information. If yes, S807 will be executed, and otherwise, S801 will be executed.

At S807, the process ends.

Above described embodiments can be referred to for details of these processes. For example, any of the above embodiments can be referred to for the method for determining whether the door has moved to the fully open position according to the first status information and the second status information. This will not be repeated here.

According to the embodiments of the present disclosure, there is provided a door detection method, which can accurately control the discharge concentration of the spreading apparatus, and reduce the probability of damage and deformation of the door, and hence extend the life of the spreading apparatus.

Further, in any of the above embodiments, the method for controlling the door to move to a preset position can include controlling the door to move to the preset position in a deceleration manner.

Controlling the door to move to the preset position in the deceleration manner includes controlling the door to move to the preset position in the deceleration manner with a decreasing acceleration, or controlling the door to move to the preset position with a constant deceleration.

When the door moves in the deceleration manner with the decreasing acceleration, the door decelerates more quickly at the beginning, and decelerates more slowly when it is about to reach the preset position. The manner can avoid damage to and deformation of the door, and reduce the door moving time since the door decelerates quickly at the beginning.

Further, in any of the above embodiments, if the control system determines that the door has not moved to the preset position, the control system may control an alarm system to transmit an alarm for a staff to calibrate the spreading apparatus in time.

Figure 9:
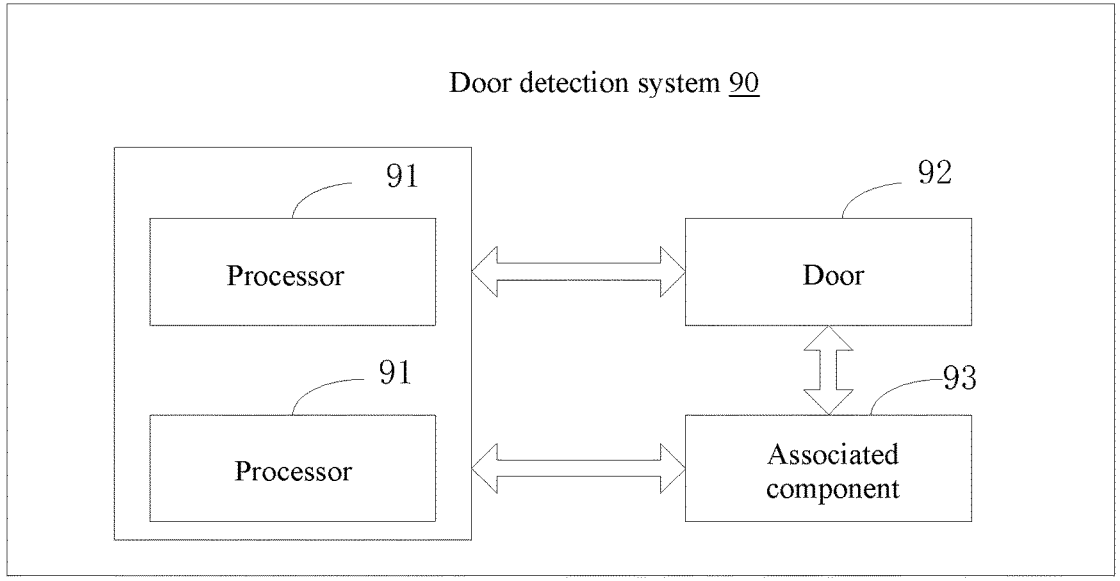
FIG. 9 is a schematic diagram showing a door detection system according to one embodiment of the present disclosure.

FIG. 9 is a schematic diagram showing a door detection system 90 according to one embodiment of the present disclosure. As shown in FIG. 9, the system includes one or more processors 91, a door 92, and an associated component of the door 93. The one or more processors 91 operate individually or in cooperation. The one or more processors 91 may be one or more processors of a spreading apparatus, one or more processors of a mobile platform, one or more processors of a spreading apparatus and one or more processors of a mobile platform, or one or more processors of a remote controller of a mobile platform. FIG. 9 is only for illustration purpose, and the connection relationship between various components of the door detection system in the embodiment of the present disclosure is not limited to this.

The one or more processors 91 are configured to control the door 92 to move toward a preset position, obtain first status information of the associated component 93 when the door 92 stops moving, and determine whether the door 92 has moved to the preset position according to the first status information and second status information, where the second status information is status information of the associated component 93 when the door 92 is located at the preset position.

In some embodiments, the one or more processors 91 are configured to determine that the door 92 has moved to the preset position if the first status information and the second status information are the same, and/or determine that the door 92 has not moved to the preset position if the first status information and the second status information are different.

In some embodiments, the one or more processors 91 are configured to determine that the door 92 has moved to the preset position if the difference between the first status information and the second status information is less than or equal to a preset threshold, and/or determine that the door 92 has not moved to the preset position if the difference between the first status information and the second status information is larger than the preset threshold.

In some embodiments, the one or more processors 91 are configured to control the door 92 to move toward a preset position through a control signal, and determine whether the door 92 has moved to the preset position according to the first status information, the second status information, and the duty cycle of the control signal.

In some embodiments, the one or more processors 91 are configured to determine whether the duty cycle of a control signal meets a preset condition if the first status information and the second status information are the same. In some embodiments, the one or more processors 91 are configured to determine that the door 92 has moved to the preset position if the duty cycle of the control signal meets the preset condition, or determine that the door 92 has not moved to the preset position if the duty cycle of the control signal does not meet the preset condition. In some embodiments, the one or more processors 91 are configured to determine that the door 92 has not moved to the preset position if the first status information and the second status information are different.

In some embodiments, the one or more processors 91 are configured to determine whether the duty cycle of the control signal meets a preset condition if the difference between the first status information and the second status information is smaller than or equal to a preset threshold. In some embodiments, the one or more processors 91 are configured to determine that the door 92 has moved to the preset position if the duty cycle of the control signal meets the preset condition, and/or determine that the door 92 has not moved to the preset position if the duty cycle of the control signal does not meet the preset condition. In some embodiments, the one or more processors 91 are configured to determine that the door 92 has not moved to the preset position if the difference between the first status information and the second status information is larger than the preset threshold.

In some embodiments, the control signal is a Pulse Width Modulation (PWM) signal.

In some embodiments, the associated component 93 is a driving motor connected to the door 92. Correspondingly, the first status information is electric current information of the driving motor when the door 92 stops moving, and the second status information is electric current information of the driving motor when the door 92 is located at the preset position.

In some embodiments, the associated component 93 is a sensor at the preset position. Correspondingly, the first status information is position information of the door 92 obtained by the sensor when the door 92 stops moving, and the second status information is position information of the door 92 obtained by the sensor when the door 92 is located at the preset position.

In some embodiments, the sensor is a position sensor or a rotation angle sensor.

In some embodiments, the associated component 93 is a limit switch. Correspondingly, the first status information is status information of the limit switch when the door 92 stops moving, and the second status information is status information of the limit switch when the door 92 is located at the preset position.

In some embodiments, the one or more processors 91 are configured to control the door 92 to move to a preset position in a deceleration manner.

In some embodiments, the one or more processors 91 are configured to control the door 92 to move to a preset position in a deceleration manner with a decreasing acceleration.

In some embodiments, the one or more processors 91 are configured to control the door 92 to move to a preset position with a constant deceleration.

In some embodiments, the preset position is a fully open position, or a fully closed position of the door 92.

In some embodiments, the one or more processors 91 are further configured to obtain second status information.

In some embodiments, the one or more processors 91 are further configured to continue to execute controlling the door 92 to move toward the preset position if it is determined that the door 92 has not moved to the preset position.

The door detection system provided in the embodiment of the present disclosure may be used to execute the technical solutions in above embodiments. The implementation principles and technical effects are similar, and are not repeated herein.

Figure 10:
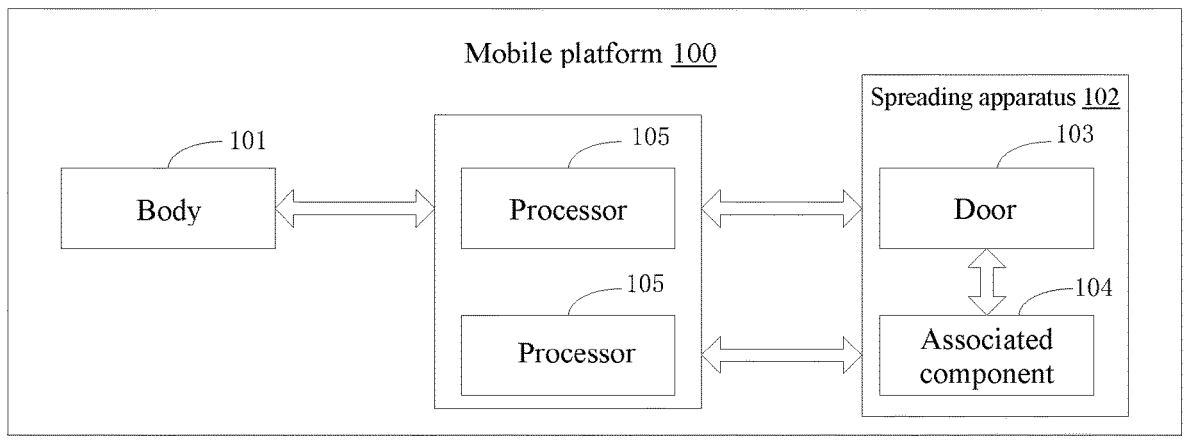
FIG. 10 is a schematic diagram showing a mobile platform according to one embodiment of the present disclosure.

FIG. 10 is a schematic diagram showing a mobile platform 100 according to one embodiment of the present disclosure. As shown in FIG. 10, the mobile platform 100 includes a body 101, and a spreading apparatus 102 provided at the body 101. The spreading apparatus 102 includes a door 103, and an associated component 104 of the door 103. FIG. 10 is only for illustration purpose, and the connection relationship between various components included in the mobile platform in the embodiment of the present disclosure is not limited to this.

The mobile platform 100 further includes one or more processors 105 that operate individually or in cooperation. The one or more processors 105 may be one or more processors of the spreading apparatus 102, one or more processors of the mobile platform 100, one or more processors of the spreading apparatus 102 and one or more processors of the mobile platform 100, or one or more processors of a remote controller of the mobile platform 100.

The one or more processors 105 are configured to control the door 103 to move toward a preset position, obtain first status information of the associated component 104 when the door 103 stops moving, and determine whether the door 103 has moved to the preset position according to the first status information and second status information, where the second status information is status information of the associated component 104 when the door 103 is located at the preset position.

In some embodiments, the one or more processors 105 are configured to determine that the door 103 has moved to the preset position if the first status information and the second status information are the same, and/or determine that the door 103 has not moved to the preset position if the first status information and the second status information are different.

In some embodiments, the one or more processors 105 are configured to determine that the door 103 has moved to the preset position if the difference between the first status information and the second status information is less than or equal to a preset threshold, and/or determine that the door 103 has not moved to the preset position if the difference between the first status information and the second status information is larger than the preset threshold.

In some embodiments, the one or more processors 105 are configured to control the door 103 to move toward a preset position through a control signal, and determine whether the door 103 has moved to the preset position according to the first status information, the second status information, and the duty cycle of the control signal.

In some embodiments, the one or more processors 105 are configured to determine whether the duty cycle of a control signal meets a preset condition if the first status information and the second status information are the same. In some embodiments, the one or more processors 105 are configured to determine that the door 103 has moved to the preset position if the duty cycle of the control signal meets the preset condition, determine that the door 103 has not moved to the preset position if the duty cycle of the control signal does not meet the preset condition, and determine that the door 103 has not moved to the preset position if the first status information and the second status information are different.

In some embodiments, the one or more processors 105 are configured to determine whether the duty cycle of the control signal meets a preset condition if the difference between the first status information and the second status information is smaller than or equal to a preset threshold. In some embodiments, the one or more processors 105 are configured to determine that the door 103 has moved to the preset position if the duty cycle of the control signal meets the preset condition, and/or determine that the door 103 has not moved to the preset position if the duty cycle of the control signal does not meet the preset condition. In some embodiments, the one or more processors 105 are configured to determine that the door 103 has not moved to the preset position if the difference between the first status information and the second status information is larger than the preset threshold.

In some embodiments, the control signal is a Pulse Width Modulation (PWM) signal.

In some embodiments, the associated component 104 is a driving motor connected to the door 103. Correspondingly, the first status information is electric current information of the driving motor when the door 103 stops moving, and the second status information is electric current information of the driving motor when the door 103 is located at the preset position.

In some embodiments, the associated component 104 is a sensor at the preset position. Correspondingly, the first status information is position information of the door 103 obtained by the sensor when the door 103 stops moving, and the second status information is position information of the door 103 obtained by the sensor when the door 103 is located at the preset position.

In some embodiments, the sensor is a position sensor or a rotation angle sensor.

In some embodiments, the associated component 104 is a limit switch. Correspondingly, the first status information is status information of the limit switch when the door 103 stops moving, and the second status information is status information of the limit switch when the door 103 is located at the preset position.

In some embodiments, the one or more processors 105 are configured to control the door 103 to move to a preset position in a deceleration manner.

In some embodiments, the one or more processors 105 are configured to control the door 103 to move to a preset position in a deceleration manner with a decreasing acceleration.

In some embodiments, the one or more processors 105 are configured to control the door 103 to move to a preset position with a constant deceleration.

In some embodiments, the preset position is a fully open position, or a fully closed position of the door 103.

In some embodiments, the one or more processors 105 are further configured to obtain second status information.

In some embodiments, the one or more processors 105 are further configured to continue to execute controlling the door 103 to move toward the preset position if it is determined that the door 103 has not moved to the preset position.

The mobile platform provided in the embodiment of the present disclosure may be used to execute the technical solutions in above embodiments. The implementation principles and technical effects are similar, and are not repeated herein.

Figure 11:
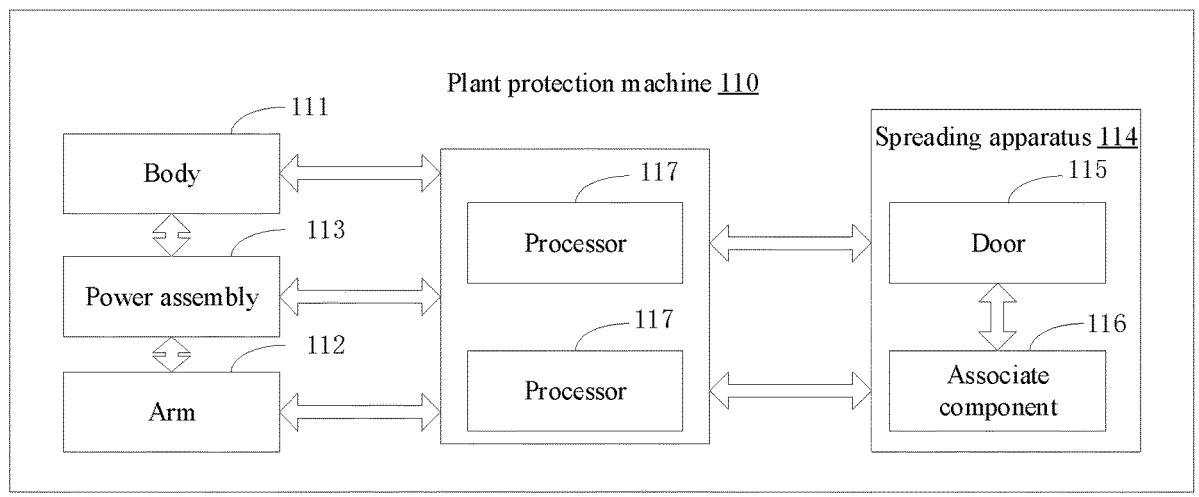
FIG. 11 is a schematic diagram showing a plant protection machine according to one embodiment of the present disclosure.

FIG. 11 is a schematic diagram showing a plant protection machine 110 according to one embodiment of the present disclosure. As shown in FIG. 11, the plant protection machine 110 includes a body 111, an arm 112 extending from the body 111, a power assembly 113 provided at the arm 112, and a spreading apparatus 114 provided at the body 111. The spreading apparatus 114 includes a door 115, and an associated component 116 of the door 115. FIG. 11 is only for illustration purpose, and the connection relationship between various components included in the plant protection machine in the embodiment of the present disclosure is not limited to this.

The plant protection machine 110 further includes one or more processors 117 that operate individually or in cooperation. The one or more processors 117 may be one or more processors of the spreading apparatus 114, one or more processors of the plant protection machine 110, one or more processors of the spreading apparatus 114 and one or more processors of the plant protection machine 110, or one or more processors of a remote controller of the plant protection machine 110.

The one or more processors 117 are configured to control the door 115 to move toward a preset position, obtain first status information of the associated component 116 when the door 115 stops moving, and determine whether the door 115 has moved to the preset position according to the first status information and second status information, where the second status information is status information of the associated component 116 when the door 115 is located at the preset position.

In some embodiments, the one or more processors 117 are configured to determine that the door 115 has moved to the preset position if the first status information and the second status information are the same, and/or determine that the door 115 has not moved to the preset position if the first status information and the second status information are different.

In some embodiments, the one or more processors 117 are configured to determine that the door 115 has moved to the preset position if the difference between the first status information and the second status information is less than or equal to a preset threshold, and/or determine that the door 115 has not moved to the preset position if the difference between the first status information and the second status information is larger than the preset threshold.

In some embodiments, the one or more processors 117 are configured to control the door 115 to move toward a preset position through a control signal, and determine whether the door 115 has moved to the preset position according to the first status information, the second status information, and the duty cycle of the control signal.

In some embodiments, the one or more processors 117 are configured to determine whether the duty cycle of a control signal meets a preset condition if the first status information and the second status information are the same. In some embodiments, the one or more processors 117 are configured to that the door 115 has moved to the preset position if the duty cycle of the control signal meets the preset condition, and/or determine that the door 115 has not moved to the preset position if the duty cycle of the control signal does not meet the preset condition. In some embodiments, the one or more processors 117 are configured to determine that the door 115 has not moved to the preset position if the first status information and the second status information are different.

In some embodiments, the one or more processors 117 are configured to determine whether the duty cycle of the control signal meets a preset condition if the difference between the first status information and the second status information is smaller than or equal to a preset threshold. In some embodiments, the one or more processors 117 are configured to determine that the door 115 has moved to the preset position if the duty cycle of the control signal meets the preset condition, and/or determine that the door 115 has not moved to the preset position if the duty cycle of the control signal does not meet the preset condition. In some embodiments, the one or more processors 117 are configured to determine that the door 115 has not moved to the preset position if the difference between the first status information and the second status information is larger than the preset threshold.

In some embodiments, the control signal is a Pulse Width Modulation (PWM) signal.

In some embodiments, the associated component 116 is a driving motor connected to the door 115. Correspondingly, the first status information is electric current information of the driving motor when the door 115 stops moving, and the second status information is electric current information of the driving motor when the door 115 is located at the preset position.

In some embodiments, the associated component 116 is a sensor at the preset position. Correspondingly, the first status information is position information of the door 115 obtained by the sensor when the door 115 stops moving, and the second status information is position information of the door 115 obtained by the sensor when the door 115 is located at the preset position.

In some embodiments, the sensor is a position sensor or a rotation angle sensor.

In some embodiments, the associated component 116 is a limit switch. Correspondingly, the first status information is status information of the limit switch when the door 115 stops moving, and the second status information is status information of the limit switch when the door 115 is located at the preset position.

In some embodiments, the one or more processors 117 are configured to control the door 115 to move to a preset position in a deceleration manner.

In some embodiments, the one or more processors 117 are configured to control the door 115 to move to a preset position in a deceleration manner with a decreasing acceleration.

In some embodiments, the one or more processors 117 are configured to control the door 115 to move to a preset position with a constant deceleration.

In some embodiments, the preset position is a fully open position, or a fully closed position of the door 115.

In some embodiments, the one or more processors 117 are further configured to obtain second status information.

In some embodiments, the one or more processors 117 are further configured to continue to execute controlling the door 115 to move toward the preset position if it is determined that the door 115 has not moved to the preset position.

The plant protection machine provided in the embodiment of the present disclosure may be used to execute the technical solutions in above embodiments. The implementation principles and technical effects are similar, and are not repeated herein.

In the embodiments of the above described door detection method, system, mobile platform, and plant protection machine, it should be noted that the processor may be a motor control unit (MCU), a central processing unit (CPU), or other general-purpose processor, a digital signal processor (DSP), an application specific integrated circuit (ASIC), etc. The general-purpose processor may be a microprocessor or any conventional processor, etc. The steps of the method embodiment may be directly implemented by a hardware processor, or may be implemented by a combination of a hardware and a software module in the processor.

Those skilled in the art should understand that all or part of the steps of the foregoing method embodiments may be implemented through a program instruction related hardware. The program may be stored in a computer-readable storage medium, and when the program is executed, the steps in the foregoing method embodiments are executed. The storage medium includes various media that can store program codes, e.g., a read-only memory (ROM), a random-access memory (RAM), a magnetic disk, or an optical disk, etc.

The present disclosure has been described with the above embodiments, but the technical scope of the present disclosure is not limited to the scope described in the above embodiments. Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the claims.

What is claimed is:

1. A door detection method comprising:
controlling, by one or more processors, a door of a spreading apparatus to move toward a preset position;
obtaining, in response to the door stopping moving, first status information of an associated component of the door, the associated component including a driving motor connected to the door, and the first status information including electric current information of the driving motor in a situation that the door stops moving; and
determining, according to second status information and the first status information, whether the door has moved to the preset position, the second status information being status information of the associated component in a situation that the door is located at the preset position and including electric current information of the driving motor in the situation that the door is located at the preset position.

2. The method of claim 1, further comprising:
determining, in response to the first status information and the second status information being same, that the door has moved to the preset position; or
determining, in response to the first status information and the second status information being different, that the door has not moved to the preset position.

3. The method of claim 1, further comprising:
determining, in response to a difference between the first status information and the second status information being less than or equal to a preset threshold, that the door has moved to the preset position; or
determining, in response to the difference between the first status information and the second status information being larger than the preset threshold, that the door has not moved to the preset position.

4. The method of claim 1, wherein:
controlling the door to move toward the preset position includes controlling the door to move toward the preset position through a control signal; and
determining whether the door has moved to the preset position includes determining whether the door has moved to the preset position according to the first status information, the second status information, and a duty cycle of the control signal.

5. The method of claim 4, wherein determining whether the door has moved to the preset position according to the first status information, the second status information, and the duty cycle of the control signal includes:
in response to the first status information and the second status information being same, determining whether the duty cycle of the control signal meets a preset condition:
determining, in response to the duty cycle of the control signal meeting the preset condition, that the door has moved to the preset position; or
determining, in response to the duty cycle of the control signal not meeting the preset condition, that the door has not moved to the preset position; or
in response to the first status information and the second status information being different, determining that the door has not moved to the preset position.

6. The method of claim 4, wherein determining whether the door has moved to the preset position according to the first status information, the second status information, and the duty cycle of the control signal:
in response to a difference between the first status information and the second status information being smaller than or equal to a preset threshold, determining whether the duty cycle of the control signal meets a preset condition:
determining, in response to the duty cycle of the control signal meeting the preset condition, that the door has moved to the preset position; or
determining, in response to the duty cycle of the control signal not meeting the preset condition, that the door has not moved to the preset position; or
in response to the difference between the first status information and the second status information being larger than the preset threshold, determining that the door has not moved to the preset position.

7. The method of claim 1, wherein:
the associated component further includes a sensor at the preset position;
the first status information further includes position information of the door obtained by the sensor in the situation that the door stops moving; and
the second status information further includes position information of the door obtained by the sensor in the situation that the door is located at the preset position.

8. The method of claim 1, wherein:
the associated component further includes a limit switch;
the first status information further includes status information of the limit switch in the situation that the door stops moving; and
the second status information further includes status information of the limit switch in the situation that the door is located at the preset position.

9. The method of claim 1, wherein controlling the door to move toward the preset position includes controlling the door to move to the preset position in a deceleration manner.

10. The method of claim 9, controlling the door to move to the preset position in a deceleration manner includes controlling the door to move to the preset position in the deceleration manner with a decreasing acceleration.

11. The method of claim 9, controlling the door to move to the preset position in a deceleration manner includes controlling the door to move to the preset position with a constant deceleration.

12. The method of claim 1, wherein the preset position is a fully opening position or a fully closed position of the door.

13. A door detection system comprising:
the door;
the associated component of the door; and
the one or more processors operating individually or in cooperation, and configured to perform the method of claim 1.

14. The system of claim 13, wherein the one or more processors are further configured to:
determine, in response to the first status information and the second status information being same, that the door has moved to the preset position; or
determine, in response to the first status information and the second status information being different, that the door has not moved to the preset position.

15. The system of claim 13, wherein the one or more processors are further configured to:
determine, in response to a difference between the first status information and the second status information being less than or equal to a preset threshold, that the door has moved to the preset position; or
determine, in response to the difference between the first status information and the second status information being larger than the preset threshold, that the door has not moved to the preset position.

16. The system of claim 13, wherein the one or more processors are further configured to:
control the door to move toward the preset position through a control signal; and
determine whether the door has moved to the preset position according to the first status information, the second status information, and a duty cycle of the control signal.

17. A plant protection machine comprising:
a body;
an arm extending from the body;
a power assembly provided at the arm;
the spreading apparatus provided at the body and including the door and the associated component of the door; and
the one or more processors operating individually or in cooperation, and configured to perform the method of claim 1.

18. The plant protection machine of claim 17, wherein:
the associated component further includes a sensor at the preset position;
the first status information further includes position information of the door obtained by the sensor in the situation that the door stops moving; and
the second status information further includes position information of the door obtained by the sensor in the situation that the door is located at the preset position.

19. A door detection method comprising:
controlling, by a processor, a door of a spreading apparatus to move toward a preset position, including controlling the door to move toward the preset position through a control signal;
obtaining, in response to the door stopping moving, first status information of an associated component of the door; and
determining whether the door has moved to the preset position according to second status information and the first status information, including determining whether the door has moved to the preset position according to the first status information, the second status information, and a duty cycle of the control signal, the second status information being status information of the associated component in a situation that the door is located at the preset position, and determining whether the door has moved to the preset position according to the first status information, the second status information, and the duty cycle of the control signal including:
in response to the first status information and the second status information being same, determining whether the duty cycle of the control signal meets a preset condition:
determining, in response to the duty cycle of the control signal meeting the preset condition, that the door has moved to the preset position; or
determining, in response to the duty cycle of the control signal not meeting the preset condition, that the door has not moved to the preset position; or
in response to the first status information and the second status information being different, determining that the door has not moved to the preset position.

20. A door detection method comprising:
controlling, by a processor, a door of a spreading apparatus to move toward a preset position, including controlling the door to move toward the preset position through a control signal;
obtaining, in response to the door stopping moving, first status information of an associated component of the door; and
determining whether the door has moved to the preset position according to second status information and the first status information, including determining whether the door has moved to the preset position according to the first status information, the second status information, and a duty cycle of the control signal, the second status information being status information of the associated component in a situation that the door is located at the preset position, and determining whether the door has moved to the preset position according to the first status information, the second status information, and the duty cycle of the control signal including:

in response to a difference between the first status information and the second status information being smaller than or equal to a preset threshold, determining whether the duty cycle of the control signal meets a preset condition:

determining, in response to the duty cycle of the control signal meeting the preset condition, that the door has moved to the preset position; or determining, in response to the duty cycle of the control signal not meeting the preset condition, that the door has not moved to the preset position; or in response to the difference between the first status information and the second status information being larger than the preset threshold, determining that the door has not moved to the preset position.

\* \* \* \* \*